United States Patent
Simmons et al.

(10) Patent No.: US 12,269,520 B1
(45) Date of Patent: Apr. 8, 2025

(54) SYSTEMS AND METHODS FOR EFFICIENTLY SWITCHING RAILCARS IN A RAILROAD YARD

(71) Applicant: BNSF Railway Company, Fort Worth, TX (US)

(72) Inventors: Thomas C. Simmons, Trophy Club, TX (US); April Y. Kuo, Colleyville, TX (US); Kevin N. Crook, Fort Worth, TX (US); Dasaradh R. Mallampati, Trophy Club, TX (US); Vishal Badyal, Haslet, TX (US); Paul Kuhn, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/649,356

(22) Filed: Apr. 29, 2024

Related U.S. Application Data

(63) Continuation of application No. 18/522,186, filed on Nov. 28, 2023, now Pat. No. 11,970,195.

(51) Int. Cl.
*B61L 17/00* (2006.01)
*B61L 21/08* (2006.01)
*B61L 27/02* (2006.01)

(52) U.S. Cl.
CPC ............. *B61L 17/00* (2013.01); *B61L 21/08* (2013.01); *B61L 27/02* (2013.01)

(58) Field of Classification Search
CPC .......... B61L 17/00; B61L 21/08; B61L 27/02
USPC ......................................................... 701/19
See application file for complete search history.

(56) References Cited

U.S. PATENT DOCUMENTS

| | | | |
|---|---|---|---|
| 6,418,854 B1 * | 7/2002 | Kraft | B61L 17/00 104/26.1 |
| 7,813,846 B2 * | 10/2010 | Wills | G06Q 50/40 701/19 |
| 9,145,151 B2 * | 9/2015 | Dierkes | B61K 7/02 |
| 9,434,398 B2 * | 9/2016 | Lucisano | B61L 27/16 |
| 10,065,665 B2 * | 9/2018 | Cooper | B61L 15/0063 |
| 10,572,850 B2 * | 2/2020 | Johnson | B61L 25/028 |

(Continued)

FOREIGN PATENT DOCUMENTS

| | | |
|---|---|---|
| CN | 107878468 B | 3/2019 |
| CN | 109532960 B | 5/2021 |

(Continued)

*Primary Examiner* — Muhammad Shafi
(74) *Attorney, Agent, or Firm* — Whitaker Chalk Swindle & Schwartz PLLC; Enrique Sanchez, Jr.

(57) ABSTRACT

A method for switching railcars at a railroad yard includes accessing a list of selected railcars for an outgoing train. The method further includes generating a plurality of train consists that each comply with a set of train rules. The method further includes displaying indications of the generated train consists and their associated number of railyard switch moves on an electronic display. The method further includes receiving a user selection of a desired train consist from the plurality of displayed train consists. The method further includes generating a plurality of switch lists according to the desired train consist and a current inventory of railcars in the railyard. The switch lists include instructions about how to form the desired train consist in the railyard. The method further includes displaying the plurality of switch lists on the electronic display.

18 Claims, 10 Drawing Sheets

(56) References Cited

U.S. PATENT DOCUMENTS

| | | | | |
|---|---|---|---|---|
| 10,710,619 | B2* | 7/2020 | LeFebvre | B61L 17/00 |
| 2001/0034642 | A1* | 10/2001 | Doner | B61L 17/00 |
| | | | | 705/13 |
| 2007/0150129 | A1* | 6/2007 | Davenport | B61L 17/00 |
| | | | | 701/19 |
| 2008/0119973 | A1* | 5/2008 | Pathak | B61L 17/00 |
| | | | | 701/19 |
| 2012/0022729 | A1* | 1/2012 | Muinonen | B61L 17/00 |
| | | | | 701/19 |

FOREIGN PATENT DOCUMENTS

| | | |
|---|---|---|
| KR | 20090072096 A | 7/2009 |
| WO | 2023097840 A1 | 12/2021 |

* cited by examiner

180A — Track 1

| Cut 720 | Seq 730 | Track 740 | To Track 750 | Cars 760 |
|---|---|---|---|---|
| Yes (710A) | 1-3 | 1 |  | A1-C1 |
| (710B) | 4-5 | 1 | 3 | B1-B2 |

FIG. 7A

180b — Track 2

| Cut 720 | Seq 730 | Track 740 | To Track 750 | Cars 760 |
|---|---|---|---|---|
| Yes (710C) | 1-2 | 2 |  | D1-D2 |
| (710D) | 3-4 | 2 | 1 | E1-E2 |

FIG. 7B

SYSTEMS AND METHODS FOR EFFICIENTLY SWITCHING RAILCARS IN A RAILROAD YARD

CROSS-REFERENCE TO RELATED APPLICATIONS

The present application is a Continuation of U.S. patent application Ser. No. 18/522,186, filed Nov. 28, 2023, the entirety of which is hereby incorporated by reference for all purposes.

TECHNICAL FIELD

This disclosure generally relates to railroads, and more specifically to systems and methods for efficiently switching railcars in a railroad yard.

BACKGROUND

A typical train is composed of one or more locomotives (sometimes referred to as engines) and one or more railcars being pulled and/or pushed by the one or more engines. Trains are typically assembled in a railroad classification yard. In typical operations of a classification yard, hundreds or thousands of rail cars are moved through classification tracks to route each of the railcars to a respectively assigned track, where the railcars are ultimately coupled to their assigned train based upon the train's route and final destination. Once the train is fully assembled, the train then departs the railyard and travels to its destination.

The process of deciding how to move or "switch" railcars around a railyard in order to assemble a departing train is typically a manual process. For example, users known as Trainmasters and in some cases, Yardmasters must determine where to "cut" (e.g., decouple or separate) a railcar or group of railcars from a longer group of railcars and then where to move the block between classification tracks in order to assemble the desired train. The manual decisions about the cutting and switching of railcars around the railroad yard in order to assemble a departing train is a complex process that often leads to inefficient and suboptimal decisions.

SUMMARY

The present disclosure achieves technical advantages as systems, methods, and computer-readable storage media that provide functionality for efficiently switching railcars in a railroad yard. The present disclosure provides for a system integrated into a practical application with meaningful limitations that may include generating and displaying, using stored train rules, a plurality of train consists that each comply with the stored train rules. Each train consist includes selected railcars for an outgoing train, sequence or order of selected railcars, and an associated number of railyard switch moves needed to build the particular train consist. Other meaningful limitations of the system integrated into a practical application include: receiving a user selection of a desired train consist from the plurality of displayed train consists; generating a plurality of switch lists according to the desired train consist and the current inventory of railcars in the railyard, the plurality of switch lists comprising instructions about how to form the desired train consist in the railyard; and displaying the plurality of switch lists on the electronic display.

The present disclosure solves the technological problem of a lack of technical functionality for performing railyard switching operations by providing methods and systems that provide efficient and optimized instructions for switching railcars in a railroad yard. The technological solutions provided herein, and missing from conventional systems, are more than a mere application of a manual process to a computerized environment, but rather include functionality to implement a technical process to supplement current manual solutions for performing railyard switching operations by providing a mechanism for providing efficient and optimized instructions for switching railcars in a railroad yard. In doing so, the present disclosure goes well beyond a mere application the manual process to a computer.

Unlike existing solutions where personnel may be required to manually determine switching instructions for a railyard, embodiments of this disclosure provide systems and methods that provide functionality for efficiently and optimally switching railcars in a railroad yard. By providing optimized switching instructions for a railyard, the efficiency of railroad switching operations may be increased and availability/efficiency of the railroad track may be increased. For example, the time required to form an outbound train may be greatly decreased, the number of switches may be decreased, the switching distance may be decreased, and the amount of fuel required for switching operations may be decreased. Other technical advantages will be readily apparent to one skilled in the art from the following figures, descriptions, and claims. Moreover, while specific advantages have been enumerated above, various embodiments may include all, some, or none of the enumerated advantages.

Accordingly, the present disclosure discloses concepts inextricably tied to computer technology such that the present disclosure provides the technological benefit of implementing functionality to provide efficient and optimized instructions for switching railcars in a railroad yard. The systems and techniques of embodiments provide improved systems by providing capabilities to perform functions that are currently performed manually and to perform functions that are currently not possible.

In one particular embodiment, a system includes one or more memory units configured to store a plurality of train rules and a current inventory of railcars in a railyard. The system further includes one or more computer processors communicatively coupled to the one or more memory units. The one or more computer processors are configured to access a list of selected railcars for an outgoing train. The one or more computer processors are further configured to generate a plurality of train consists that each comply with a set of train rules. The one or more computer processors are further configured to display indications of the generated train consists and their associated number of railyard switch moves on an electronic display. The one or more computer processors are further configured to receive a user selection of a desired train consist from the plurality of displayed train consists. The one or more computer processors are further configured to generate a plurality of switch lists according to the desired train consist and a current inventory of railcars in the railyard. The switch lists include instructions about how to form the desired train consist in the railyard. The one or more computer processors are further configured to display the plurality of switch lists on the electronic display.

In another embodiment, a method for switching railcars at a railroad yard includes accessing a list of selected railcars for an outgoing train. The method further includes generating a plurality of train consists that each comply with a set of train rules. The method further includes displaying indications of the generated train consists and their associated number of railyard switch moves on an electronic display. The method further includes receiving a user selection of a desired train consist from the plurality of displayed train consists. The method further includes generating a plurality of switch lists according to the desired train consist and a current inventory of railcars in the railyard. The switch lists include instructions about how to form the desired train consist in the railyard. The method further includes displaying the plurality of switch lists on the electronic display.

In another embodiment, one or more computer-readable non-transitory storage media embodies instructions that, when executed by a processor, cause the processor to perform operations that include accessing a list of selected railcars for an outgoing train. The operations further include generating a plurality of train consists that each comply with a set of train rules. The operations further include displaying indications of the generated train consists and their associated number of railyard switch moves on an electronic display. The operations further include receiving a user selection of a desired train consist from the plurality of displayed train consists. The operations further include generating a plurality of switch lists according to the desired train consist and a current inventory of railcars in the railyard. The switch lists include instructions about how to form the desired train consist in the railyard. The operations further include displaying the plurality of switch lists on the electronic display.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which:

FIGS. 7A-7B illustrate switch lists that may be generated by the switch list generator of FIGS. 1 and 2, according to particular embodiments.

Figure 1:
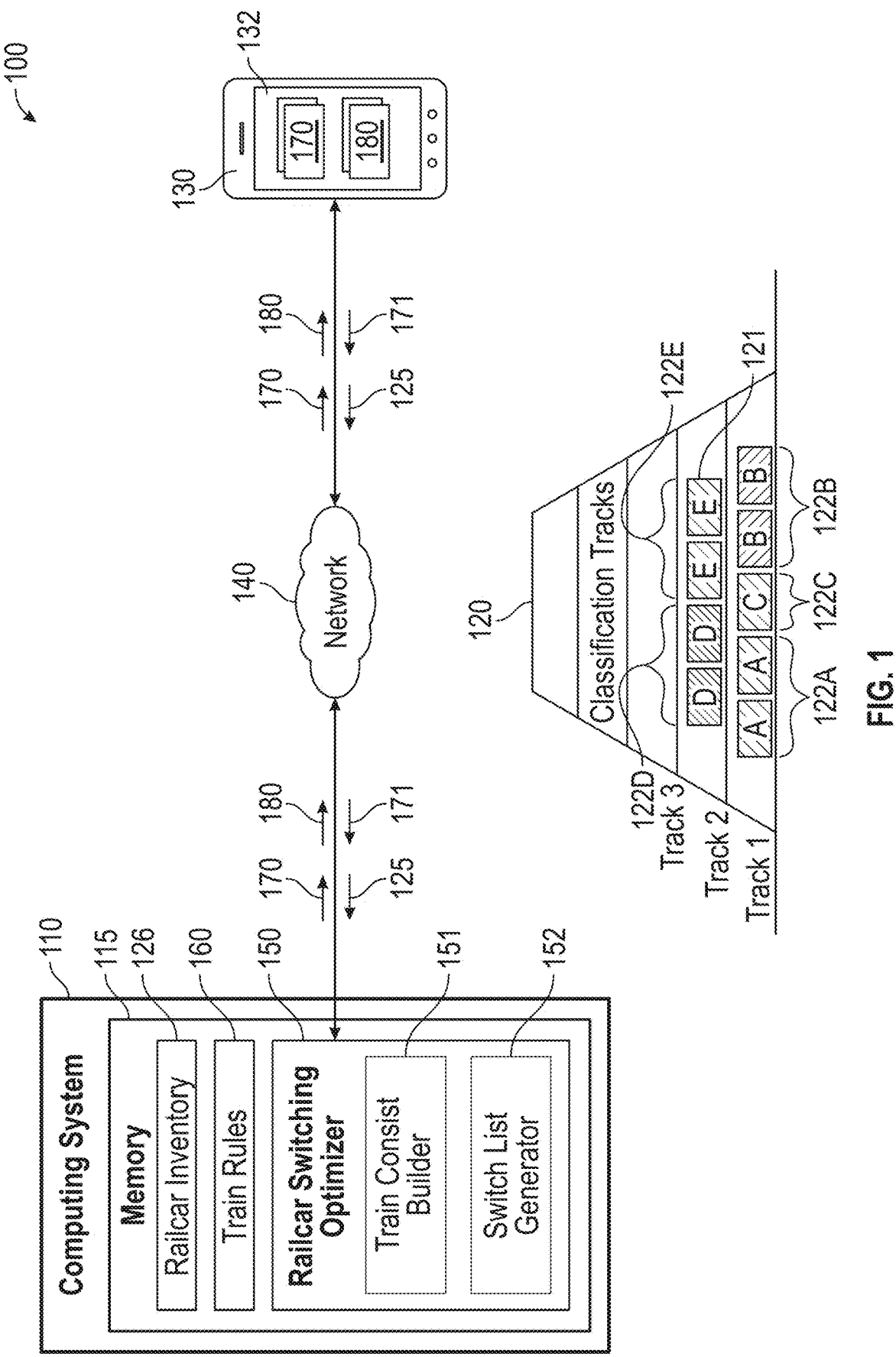
FIG. 1 is a diagram illustrating a railcar switching optimization system, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

A typical train is composed of one or more locomotive engines and one or more railcars being pulled and/or pushed by the one or more engines. Trains are typically assembled in a railroad classification yard. In typical operations of a classification yard, hundreds or thousands of train cars are moved through classification tracks to route each of the railcars to a respectively assigned track, where the railcars are ultimately coupled to their assigned train. Once the train is fully assembled, the train may leave the railroad yard and travel to its destination.

The process of deciding how to move or "switch" railcars around a railroad yard in order to assemble a departing train is typically a manual process. For example, a user known as a Trainmaster must determine where to "cut" (e.g., decouple or separate) a railcar or group of railcars from a longer group of railcars and then where to move the block between classification tracks in order to assemble the desired train. The manual decisions about the cutting and switching of railcars around the railroad yard in order to assemble a departing train is a complex process that often leads to inefficient and suboptimal decisions.

To address these and other problems with railroad yard switching operations, the disclosed embodiments provide systems and methods for efficiently switching railcars at a railroad yard. In some embodiments, the disclosed systems and methods utilize a railcar switching optimizer that includes two stages: 1) a train consist builder, and 2) a switch list generator. The train consist builder generates multiple train consist options that each include selected railcars for an outgoing train and their sequence in the build. Each train consist option is generated by the train consist builder to comply with stored train rules (e.g., train blocking rules, train consist makeup rules, train hazmat rules, etc.) and has an associated number of railyard switch moves needed to build the particular train consist. Each train consist option that is generated by the train consist is displayed to a user (e.g., a Trainmaster) on an electronic display. The user selects a desired train consist from the displayed train consists and the selected train consist is then provided to the switch list generator. The switch list generator generates one or more switch lists according to the desired train consist and a current inventory of railcars in the railyard. The switch lists include instructions about how to form the desired train consist in the railyard (e.g., to be used by a switchman) and may include a sequence of cuts and moves of railcars for a particular track in the railyard. In summary, the train consist builder identifies the train block order and railcar positions within their respective block (i.e., "what" needs to be done), whereas the switch list generator specifies "how" to do it.

FIG. 1 is a diagram illustrating a railcar switching optimization system 100, according to certain embodiments. In general, railcar switching optimization system 100 is used to efficiently control switching operations in a railyard 120. Railcar switching optimization system 100 includes one or more computing systems 110 (collectively herein, "computing system 110"), a client system 130, and a network 140. Client system 130 is communicatively coupled with computing system 110 using any appropriate wired or wireless communication system or network (e.g., network 140). Client system 130 includes an electronic display 132 for displaying various information and user-selectable elements that permit a user to view and select a desired train consist 170 generated by computing system 110 (i.e., by train consist builder 151 of railcar switching optimizer 150), as described in more detail herein. In addition, electronic display may display one or more switch lists 180 generated by computing system 110 (i.e., by switch list generator 152 of railcar switching optimizer 150) that provides instructions about how to form the desired train consist selected by the user in railyard 120.

Figure 4A:
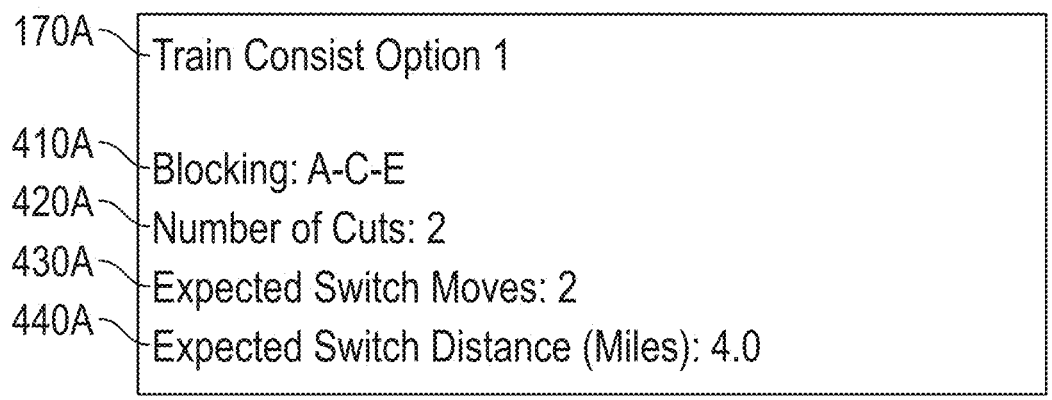
FIGS. 4A-4B illustrate train consists that may be generated by the train consist builder of FIGS. 1 and 2, according to particular embodiments.
Figure 4B:
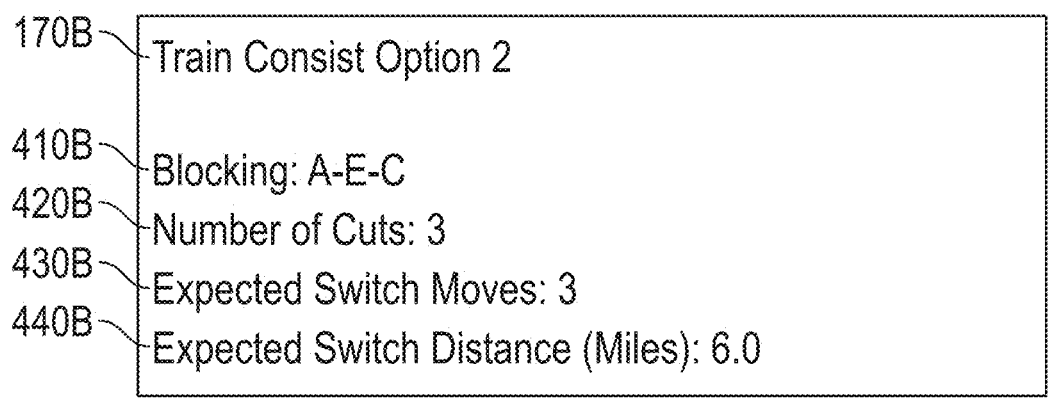

In general, railcar switching optimization system 100 utilizes railcar switching optimizer 150 to provide optimized switching instructions (i.e., switch lists 180) for switching railcars 121 in railyard 120. To do so, railcar switching optimizer 150 accesses a list 125 of selected railcars 121 for an outgoing train. Next, train consist builder 151 generates, using train rules 160, multiple train consists 170 that each comply with train rules 160. Each particular train consist 170 includes the selected railcars 121 for the outgoing train and an associated number of railyard switch moves needed to build the particular train consist. Next, railcar switching optimization system 100 displays indications of the generated train consists 170 and their associated number of railyard switch moves on electronic display 132 of client system 130 (e.g., as illustrated in FIGS. 4A-4B). A user (e.g., a Trainmaster) may then select one of the displayed train consists 170 for implementation. Once a desired train consist 170 is selected on client system 130, railcar switching optimizer 150 receives a user selection 171 of the desired train consist. Next, switch list generator 152 generates and displays (e.g., on client system 130) one or more switch lists 180 according to the desired train consist and a current inventory 126 of railcars in railyard 120 (e.g., as illustrated in FIGS. 7A-7B). Each switch list 180 is associated with a particular track of railyard 120 and indicates a sequence of cuts and moves of a plurality of railcars 121 for the particular track. A user (e.g., a switchman) may utilize the generated switch lists 180 in order to efficiently move railcars 121 around railyard 120 in order to build the desired train consist for the outgoing train. As a result, switching operations within railyard 120 may be optimized and be more efficient than typical operations where a Trainmaster manually decides cuts and switch moves within railyard 120.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computer systems; be unitary or distributed; span multiple locations; span multiple machines; span multiple data centers; or reside in a cloud, which may include one or more cloud components in one or more networks. Where appropriate, computing system 110 may perform without substantial spatial or temporal limitation one or more steps of one or more methods described or illustrated herein. As an example, and not by way of limitation, computing system 110 may perform in real time or in batch mode one or more steps of one or more methods described or illustrated herein. Computing system 110 may perform at different times or at different locations one or more steps of one or more methods described or illustrated herein, where appropriate. A particular example of a computing system 110 is described in reference to FIG. 9.

Computing system 110 includes one or more memory units/devices 115 (collectively herein, "memory 115") that may store railroad train rules 160, a current inventory 126 of railcars in railyard 120, and a railcar switching optimizer 150. Railcar switching optimizer 150 may be a software module/application utilized by computing system 110 to provide switch lists 180 for efficiently switching railcars 121 in railyard 120, as described herein. Railcar switching optimizer 150 represents any suitable set of instructions, logic, or code embodied in a computer-readable storage medium. For example, railcar switching optimizer 150 may be embodied in memory 115, a disk, a CD, or a flash drive. In particular embodiments, railcar switching optimizer 150 may include instructions (e.g., a software application) executable by a computer processor to perform some or all of the functions described herein. An example of railcar switching optimizer 150 is discussed in more detail below in reference to FIG. 2.

Railyard 120 is a collection of connected railroad tracks for storing and sorting railcars 121. In some embodiments, railyard 120 is a flat yard with classification tracks for classifying and sorting railcars 121 for trains such as merchandise trains (also called "carload" or "manifest" trains). Unlike most train types, a merchandise train transports railcars 121 destined for multiple locations. The merchandise network can be likened to a traditional 'hub-and-spoke' system in which trains originating from the 'spokes' in the network bring railcars 121 into a 'hub' railyard 120. The 'hub' railyard 120 then groups similar railcars 121 for advancement to the next 'hub' railyard 120 that is closer to the railcar's ultimate destination. These intermediate railyards 120 are used to gather railcars 121 from several inbound trains and then block (or "switch") them together before sending them out on corresponding outbound trains.

Railcar 121 is any possible type of railcar that may be coupled to a train. Block 122 is a group of railcars 121. In some embodiments, railcars 121 within a block 122 may originate from disparate origins and may be destined for disparate destinations. A block 122 originating from a location can be composed of railcars 121 whose final destinations are different and could have originated from different locations. When railcars 121 arrive to an intermediate railyard 120, the block 122 may be broken up and railcars 121 from different trains may be re-blocked based on train schedules.

Client system 130 is any appropriate user device for communicating with components of computing system 110 over network 140 (e.g., the internet). In particular embodiments, client system 130 may be an electronic device including hardware, software, or embedded logic components or a combination of two or more such components and capable of carrying out the appropriate functionalities implemented or supported by client system 130. As an example, and not by way of limitation, a client system 130 may include a computer system (e.g., computer system 900) such as a desktop computer, notebook or laptop computer, netbook, a tablet computer, e-book reader, GPS device, camera, personal digital assistant (PDA), handheld electronic device, cellular telephone, smartphone, smartwatch, augmented/virtual reality device such as wearable computer glasses, other suitable electronic device, or any suitable combination thereof. This disclosure contemplates any suitable client system 130. A client system 130 may enable a network user at client system 130 to access network 110. A client system 130 may enable a user to communicate with other users at other client systems 130. Client system 130 may include an electronic display that displays graphical user interface 132, a processor such processor 902, and memory such as memory 904.

Network 140 allows communication between and amongst the various components of railcar switching optimization system 100. This disclosure contemplates network 140 being any suitable network operable to facilitate communication between the components of railcar switching optimization system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

Train rules 160 are restrictions on the consist of a train (i.e., which railcars 121 form a train and their specific sequence/location within the train). In some embodiments, train rules 160 include a plurality of train blocking rules, a plurality of train hazmat rules, and a plurality of train makeup rules. The train blocking rules impose restrictions on the sequence of blocks 122 within the train (e.g., according to geographical destinations of blocks 122). The train hazmat rules impose restrictions on the placement within the train of railcars 121 carrying hazardous materials such as explosives or chemicals. The train makeup rules impose restrictions on the overall sequence/location within the train of railcars 121 based on considerations such as railcar length and weight distribution (e.g., how loaded and empty railcars 121 are distributed throughout a train).

In operation, railcar switching optimization system 100 utilizes railcar switching optimizer 150 to provide optimized switching instructions (i.e., switch lists 180 illustrated in FIGS. 7A-7B) that enable optimized/efficient switching of railcars 121 within railyard 120. To do so, railcar switching optimizer 150 may first access a list 125 of selected railcars 121 for an outgoing train. For example, list 125 may indicate that the railcars 121 within blocks 122A, 122C, and 122E (illustrated in FIG. 1 with identical hatch patterns) have been selected for an outgoing train. Next, train consist builder 151 generates, using train rules 160, multiple train consists 170 that each comply with train rules 160. An example of train consist 170 is illustrated in FIGS. 4A-4B, and an example algorithm used by train consist builder 151 to generate train consists 170 is discussed below in reference to FIGS. 2-4. Train rules 160 encompass weight distribution within the final consist, railcar sizes and weights, placement of hazardous commodity types, and the like. If the railcar position within the block 122 violates any of train rules 160, train consist builder 151 locates a spot in the block 122 that complies with train rules 160. In some embodiments, train consist builder 151 assigns each generated train consist to the shortest available departing track that can accommodate the train consist. Each particular train consist 170 generated by train consist builder 151 includes the selected railcars 121 for the outgoing train and an associated number of railyard switch moves needed to build the particular train consist.

After generating train consists 170, railcar switching optimization system 100 displays indications of the generated train consists 170 and their associated number of railyard switch moves on electronic display 132 of client system 130 (e.g., as illustrated in FIGS. 4A-4B). A user (e.g., a Trainmaster) may then select one of the displayed train consists 170 for implementation. For example, a user may select a particular train consist 170 that has the fewest indicated switch moves. In some embodiments, each train consist 170 may also include an expected switch distance (e.g., a combined total distance that railcars 121 within railyard 120 would traverse to form the associated train consist), and a user may select a particular train consist 170 that has the lowest expected switch distance. In some embodiments, railcar switching optimization system 100 automatically selects the most efficient (e.g., the fewest switch moves, the lowest total switch distance, etc.) without any user selection or intervention.

After a user selects a desired train consist 170 on client system 130, railcar switching optimizer 150 receives or otherwise accesses a user selection 171 of the desired train consist. Next, switch list generator 152 generates and displays (e.g., on client system 130) one or more switch lists 180 according to the desired train consist and a current inventory 126 of railcars in railyard 120 (e.g., as illustrated in FIGS. 7A-7B). Each switch list 180 is associated with a particular track of railyard 120 and indicates an optimized sequence of cuts and moves of railcars 121 for the particular track. An example algorithm used by switch list generator 152 to generate optimized switch lists 180 is discussed below in reference to FIG. 2. A user (e.g., a switchman) may utilize the generated switch lists 180 in order to efficiently move railcars 121 around railyard 120 in order to build the desired train consist for the outgoing train. As a result, switching operations within railyard 120 may be optimized and be more efficient than typical operations where a Trainmaster manually decides cuts and switch moves within railyard 120.

Figure 2:
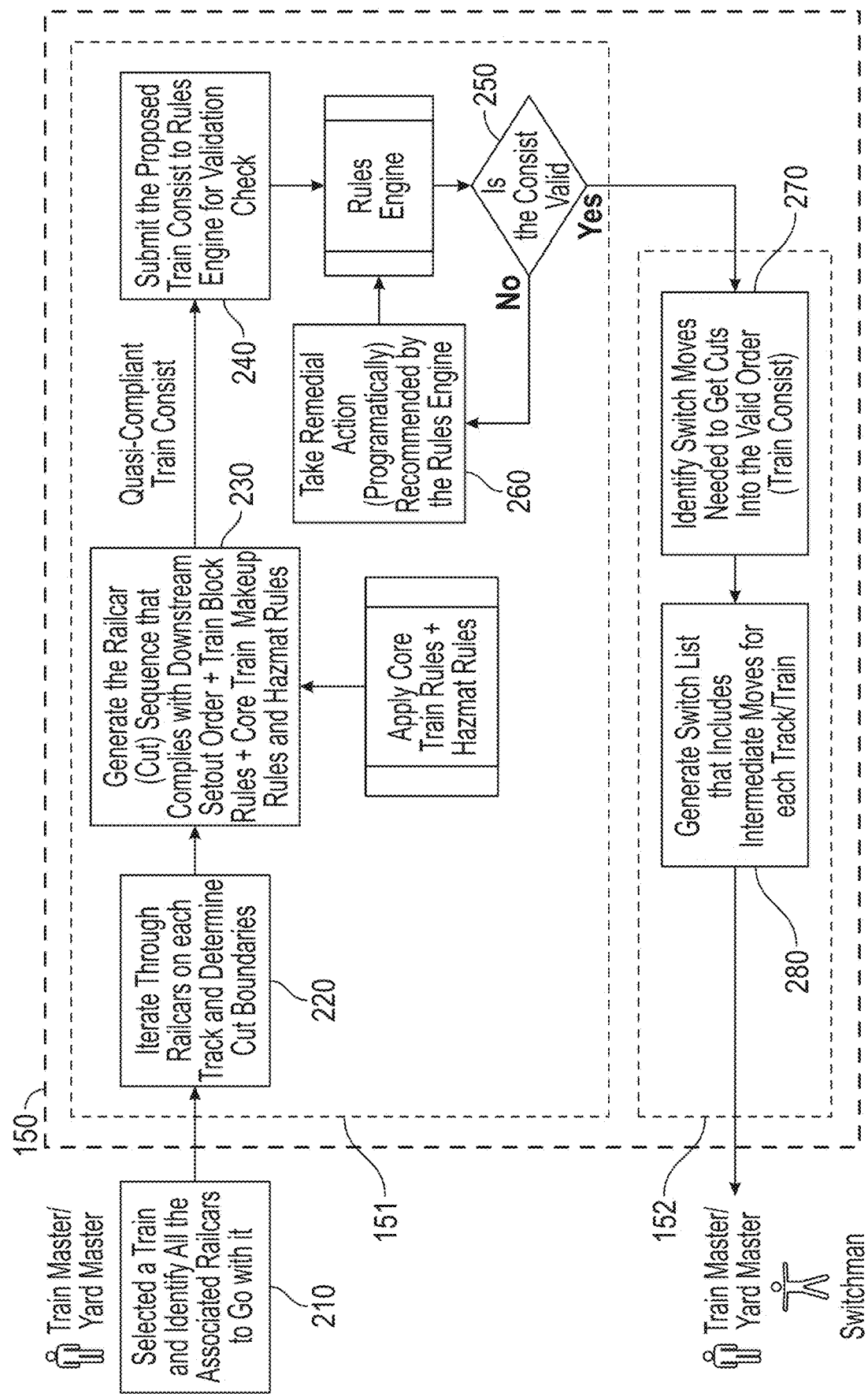
FIG. 2 is a diagram illustrating a railcar switching optimizer that may be utilized by the system of FIG. 1, according to particular embodiments.
Figure 3A:
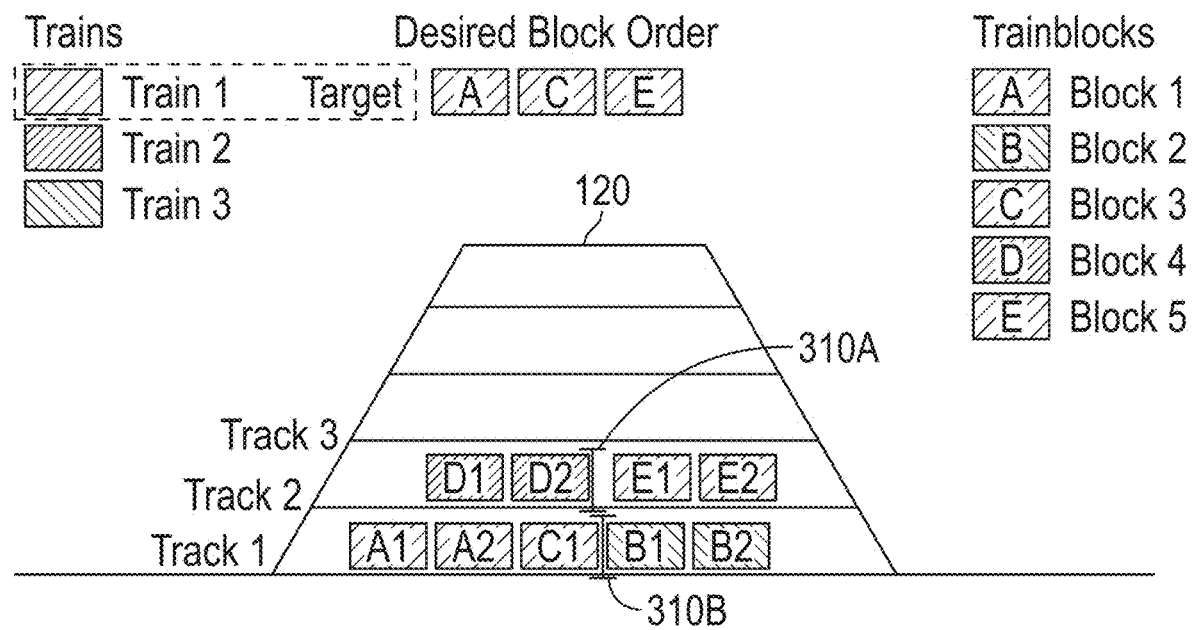
FIGS. 3A-3D illustrate the switching of railcars in a railyard, according to particular embodiments.
Figure 3B:
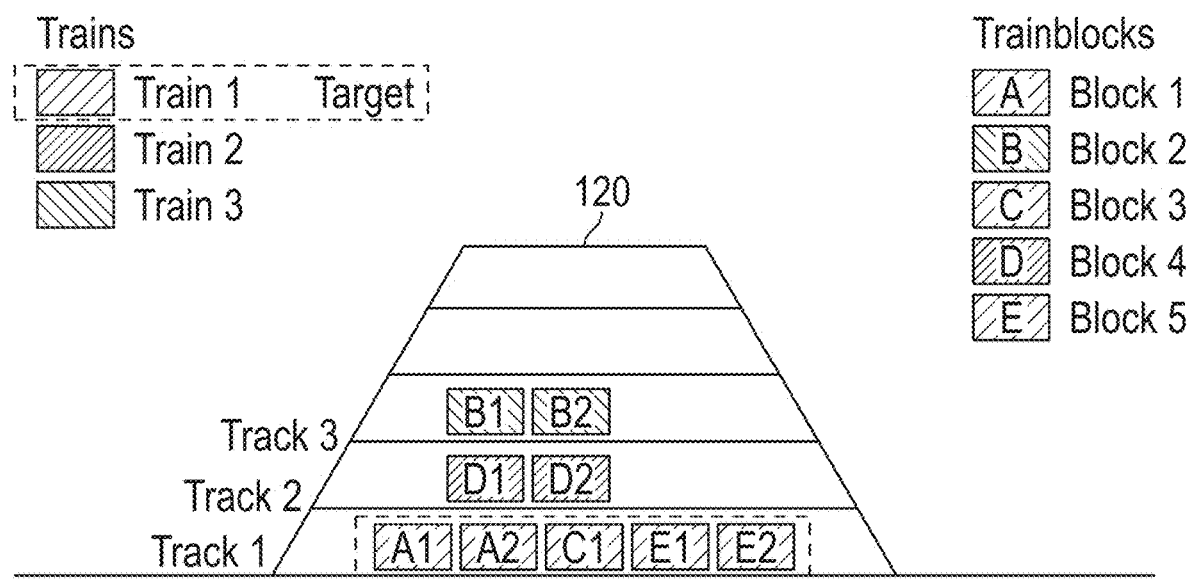
Figure 3C:
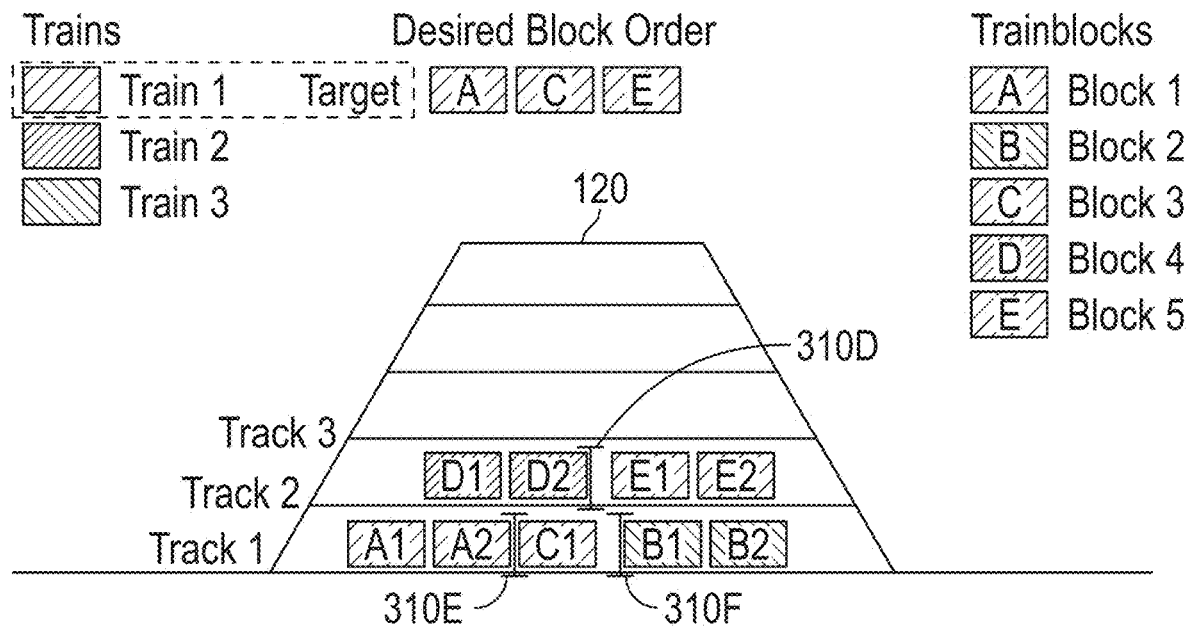
Figure 3D:
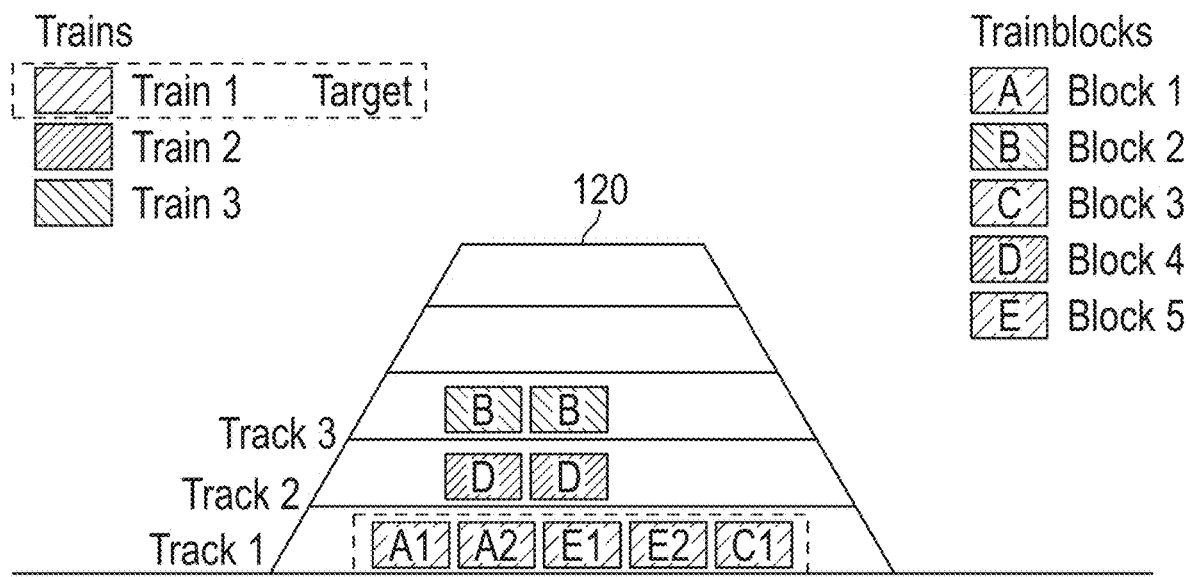
Figure 5:
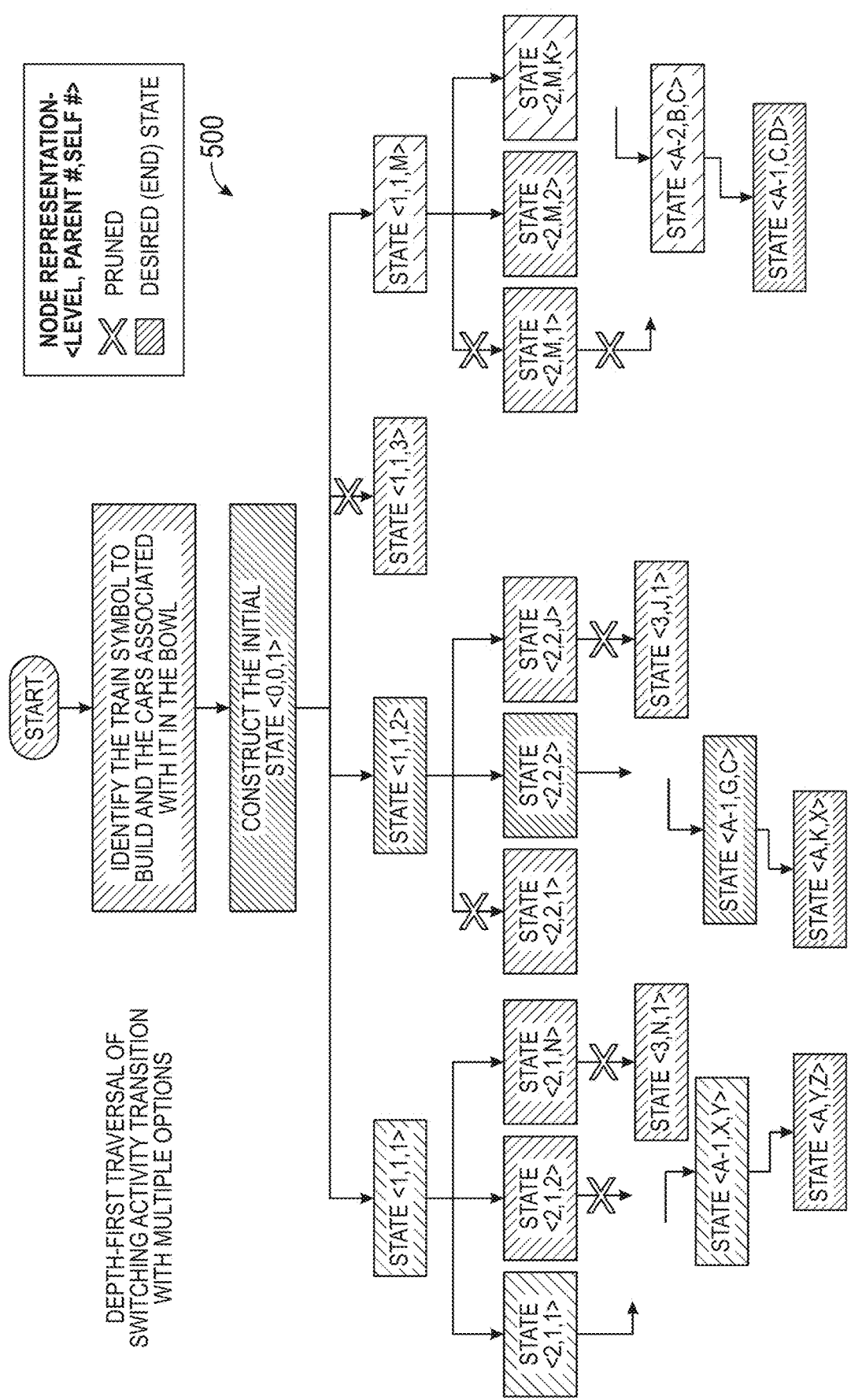
FIG. 5 is a chart illustrating a method that may be utilized by the switch list generator of FIGS. 1 and 2, according to particular embodiments.
Figure 6:
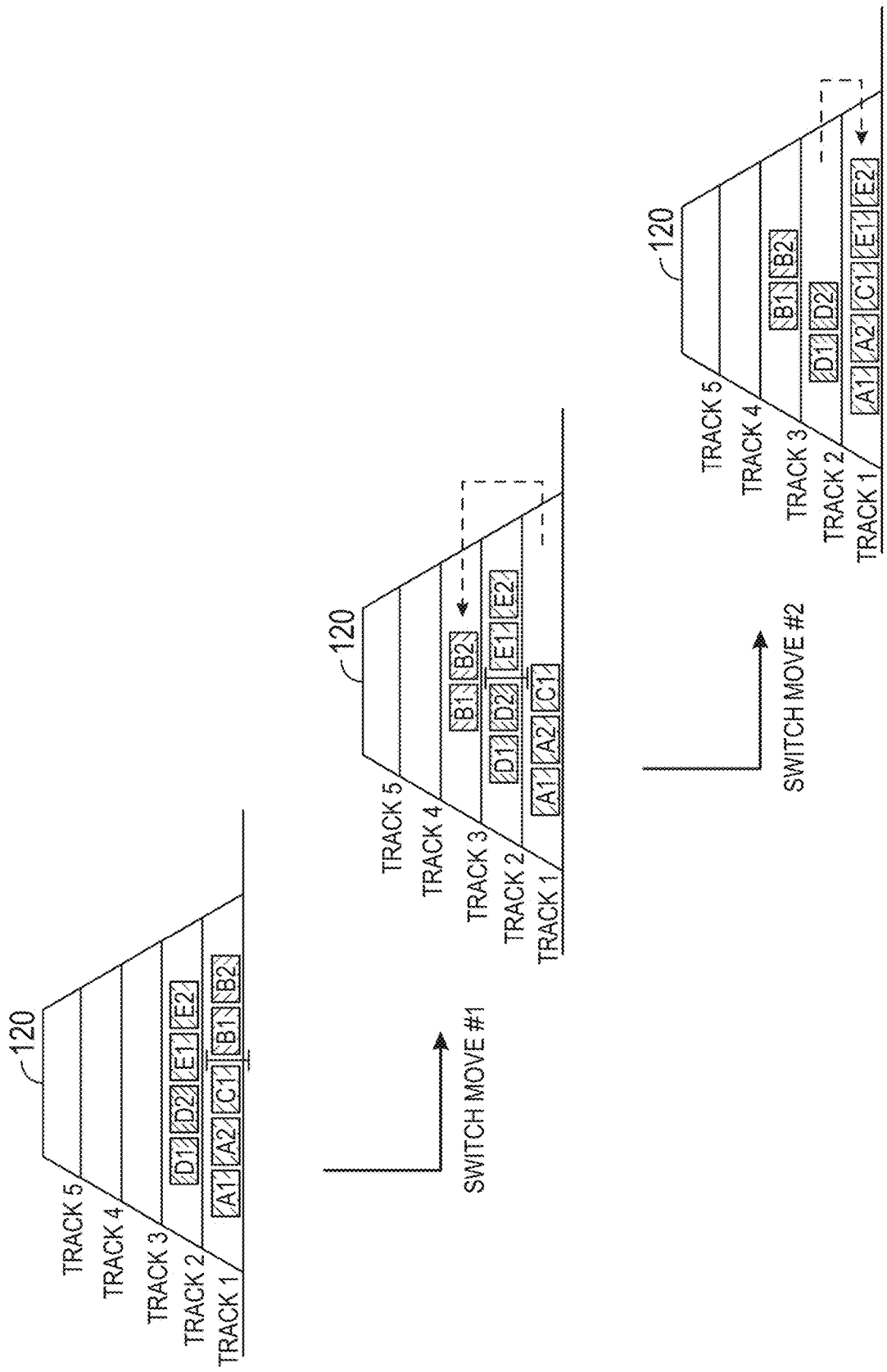
FIG. 6 illustrates railyard switch moves that may be determined by the switch list generator of FIGS. 1 and 2, according to particular embodiments.

FIG. 2 is a diagram illustrating a railcar switching optimizer 150 that may be utilized by railcar switching optimization system 100, according to particular embodiments. In general, some embodiments of railcar switching optimizer 150 include two separate modules/processes for generating switch lists 180: train consist builder 151 and switch list generator 152. Each of these modules/processes will be discussed in more detail below with additional reference to FIGS. 3A-7. FIGS. 3A and 3C illustrate beginning states of railyard 120, and FIGS. 3B and 3D illustrate desired end states of railyard 120. FIGS. 4A-4B illustrate example train consists 170 that may be generated by train consist builder 151. FIG. 5 is a chart illustrating an example method 500 that may be utilized by switch list generator 152. FIG. 6 illustrates example railyard switch moves that may be determined by switch list generator 152. FIGS. 7A-7B illustrate example switch lists 180 that may be generated by switch list generator 152.

At block 210 of FIG. 2, a user such as a Trainmaster identifies all railcars 121 within railyard 120 that are to form an outgoing train. For example, as illustrated in FIG. 3A, a user has selected railcars 121 of blocks 1, 3, and 5 (railcars A1, A2, C1, E1, and E2) for outgoing Train 1. In some embodiments, the user identifies railcars 121 within railyard 120 that are to form an outgoing train using client system 130. In some embodiments, the user's selection of railcars 121 that are to form an outgoing train are provided via list 125. In some embodiments, the user additionally provides a desired block order for the outgoing train. In this example, the desired block order for Train 1 is Block 1-Block 3-Block 5 (i.e., A-C-E).

At block 220, train consist builder 151 iterates through the current railcars 121 on tracks of railyard 120 and determines one or more cuts 310 (i.e., pin pulls or railcar disengagements). In this block, train consist builder 151 may first access current railcar inventory 126 that indicates the current state of railyard 120. Using the illustration in FIG. 3A as an example, current railcar inventory 126 may indicate that the railcar sequence of D1-D2-E1-E2 is currently located on Track 2, and the railcar sequence of A1-A2-C1-B1-B2 is currently located on Track 1. Train consist builder 151 may in block 220 analyze and compare the current railcar inventory 126 to the list 125 of selected railcars 121 for the outgoing train and determine that selected railcars 121 need to be decoupled or cut from other non-selected railcars 121. In the illustrated example, train consist builder 151 determines that two cuts 310 are needed: a first cut 310A between cars D2 and E1 and a second cut 310B between cars C1 and B1. In general, train consist builder 151 attempts to find the fewest amount of switch moves and/or the lowest total switch distance when attempting to form train consists.

At block 230, train consist builder 151 generates one or more train consists (i.e., railcar sequences) that each comply with train rules 160. In some embodiments, the train rules 160 include train blocking rules, train makeup rules, and train hazmat rules, as discussed herein. In this block, train consist builder 151 may compare list 125 of selected railcars 121 to train rules 160 (or to a selected subset of train rules 160 to decrease processing time) in order to generate a quasi-compliant train consist. Using the illustrated example of FIG. 3B, train consist builder 151 may determine that a sequence of A1-A2-C1-E1-E2 complies with train rules 160. Using the illustrated example of FIG. 3D, train consist builder 151 may determine that an alternative sequence of A1-A2-E1-E2-C1 complies with train rules 160. Each train consist generated in block 230 includes all selected railcars 121 from list 125.

At block 240, train consist builder 151 submits each generated train consist from block 250 to a rules engine for validation. In general, the rules engine compares each generated train consist from block 230 to rules 160 in order to verify that each train consist is compliant with every rule within train rules 160. In some embodiments, the train rules that are validated in block 240 are a larger number of rules than used in block 230 and may include industry-standard and regulatory rules. At block 250, train consist builder 151 determines whether a submitted train consist passed the rules engine validation of block 240. If a particular train consist passes validation by the rules engine in block 240, the train consist is saved and displayed to the user as train consist 170. On the other hand, if a particular train consist does not pass validation by the rules engine in block 240, train consist builder 151 may take automatic remedial action in block 260. For example, train consist builder 151 may access one or more train rules that a particular train consist did not meet and attempt to rearrange the train consist to meet the failed rules. After block 260, train consist builder 151 may proceed to submit the modified train consist to the rules engine again for validation.

After block 250, train consists 170 generated and validated in blocks 230-240 may be displayed to a user on client system 130. FIGS. 4A-4B illustrate example train consists 170 that correspond to FIGS. 3B and 3D, respectively. Each train consist 170 indicates a blocking order 410, a number of cuts 420, a number of expected switch moves 430, and an expected switch distance 440. In the illustrated example of FIG. 4A, railcar switching optimization system 100 displays train consist 170A that corresponds to the generated train consist of FIG. 3B. Train consist 170A includes a blocking order 410A of "A-C-E," a number of cuts 420A of "2," a number of expected switch moves 430A of "2", and an expected switch distance 440A of "4.0". In the illustrated example of FIG. 4B, railcar switching optimization system 100 displays train consist 170B that corresponds to the generated train consist of FIG. 3D. Train consist 170B includes a blocking order 410B of "A-E-C," a number of cuts 420B of "3," a number of expected switch moves 430B of "3", and an expected switch distance 440B of "6.0."

After train consists 170 are displayed to a user, the user may select a desired train consist 170. Using the example train consists 170 of FIGS. 4A-4B, a user would likely select train consist 170A because it requires fewer cuts, fewer switches, and less switch distance to implement than train consist 170B. After receiving the user's selection of the desired train consist (e.g., via user selection 171), railcar switching optimizer 150 may then utilize switch list generator 152 to generate switch lists 180. To do so, switch list generator 152 may in block 270 identify the switch moves needed to get the cuts into the desired consist. Using the illustrated examples of FIGS. 3A-3B, switch list generator 152 may identify two needed switch moves to achieve the desired train consist of FIG. 3B. For example, as illustrated in FIG. 6, switch list generator 152 may identify "SWITCH MOVE #1" as: move Block 2 (railcars B1-B2) from Track 1 to Track 3, and "SWITCH MOVE #2" as: move Block 5 (railcars E1-E2) from Track 2 to Track 1.

In some embodiments, switch list generator 152 may in block 270 utilize a depth-first method as illustrated in FIG. 5 to identify the switch moves needed to get the cuts into the desired consist. For example, for a particular track, a plurality of cars can occupy that track. The option tree 500 can function as a sorting algorithm to sort potential car moves to build an optimized consist. The options that do not comply with a particular rule 160 can be pruned from the option tree. For example, FIG. 5 illustrates an option tree 500 of a depth-first traversal of switching activity transition with multiple options. In these embodiments, switch list generator 152 constructs a tree of states (possible consist builds and moved) until one or more desired end states (train builds) are achieved. On each branch of the tree, a state may be pruned if, for example, the state does not comply with one or more train rules 160. In the illustrated example of FIG. 5, three desired end states were achieved by building the illustrated tree of states. Each node or state in the option tree 500 can be represented by a level, a parent node number, and a self number.

A method can begin by identifying the train symbol to build and the rail cars associated with it in the bowl. In one embodiment, the switch list generator 152 can construct an initial state. The initial state can be identified as <0, 0, 1> as it is the top level (level 0), it is the parent (0), and self 1 of 1 as the parent. Moving down the tree, the level increments to level 1, the parent number for each of the states in this level is 1, as the parent's self number is 1 from above. And the self number for each state is incremented for each of the states from 1:m. As such, the node representation for each node in level 1 is <1, 1, m>, with m being the respective self number for each state. The option tree 500 continues in this way for each subsequent level, incrementing the level number, referencing the parent self number of the immediately preceding parent, and incrementing the self number for each state accordingly. For example, the children of state <1,1,2> include states <2,2,1>, <2,2,2>, and <2,2,j>, with j being the respective self number for each state.

This graphical representation of states can represent the car move options in the generation of a consist that does not violate any rules (e.g., a desired end state), as the moves that violate the rules 160 are pruned from the option tree 500 as non-options. The option tree 500 can result in a listing of several desired end states that do not violate the rules. However, not all options have the same number of expected switch moves or the same expected switch distances, as discussed related to FIGS. 4A and 4B. In some embodiments, the optimal desired end state can include the state with the fewest number of expected switch moves and the fewest expected switch distance. Of course, given a particular application or yard, specific guidelines may alter the determination of the optimal desired end state. Accordingly, a listing of all the desired end states that do not violate any rules 160 are provided for possible further processing.

Given a particular train consist for a particular yard, the switch list generator 152 can generate a listing of all possible moves and cuts of the train consist to build a next train consist. The switch list generator 152 can include evaluation criteria for each state to reduce the processing load. For example, the evaluation criteria can include how close a particular state is to the target state. Additionally, the switch list generator 152 can calculate the fitness of all the possible states and only retain a predetermined number that are likely to lead to the target (desired) state quicker. Determining that a particular state is revisited can also result in a pruning in a particular branch (option). In some embodiments, the switch list generator 152 can keep cuts coupled in current state as desired in target state together in the children node. Additionally, the switch list generator 152 may not allow repeated states in a switch list.

After block 270, switch list generator 152 in block 280 generates switch lists 180 using the switch moves identified in block 270. Switch lists 180 provide detailed instructions about how to form the desired train consist in railyard 120. In some embodiments, each switch list 180 is associated with a particular track of railyard 120. In general, each switch list 180 indicates a sequence of cuts and moves of a plurality of railcars for the particular track. For example, FIGS. 7A-7B illustrate switch lists 180A-180B that may be generated by switch list generator 152 for the selected train consist shown in FIG. 3B. In the illustrated embodiments, switch lists 180 include multiple entries 710 (e.g., 710A-710D). Each entry 710 includes a cut indicator 720 (i.e., whether or not the action is a pin pull), a sequence range 730, a current track location 740, a destination track 750, and a car indicator 760. For example, switch list 180A, which corresponds to "SWITCH MOVE #1" of FIG. 6, includes entries 710A-710B. Entry 710A includes a cut indicator 720 of "YES," a sequence range 730 of "1-3," a current track location 740 of "1," and car indicator 760 of "A1-C1" in order to indicate to a user to pull a pin between cars C1 and B1 that are currently on TRACK 1. Entry 710B includes a blank cut indicator 720 to indicate that the action is not a pin pull, a sequence range 730 of "4-5," a current track location 740 of "1," a destination track 750 of "3," and car indicator 760 of "B1-B2" in order to indicate to a user to move coupled cars B1 and B2 that are currently on TRACK 1 to TRACK 3. Furthermore, switch list 180B, which corresponds to "SWITCH MOVE #2" of FIG. 6, includes entries 710C-710D. Entry 710C includes a cut indicator 720 of "YES" to indicate that the action is a pin pull, a sequence range 730 of "1-2," a current track location 740 of "2," and car indicator 760 of "D1-D2" in order to indicate to a user to pull the pin between cars D2 and E1 that are currently on TRACK 2. Entry 710D includes a blank cut indicator 720 to indicate that the action is not a pin pull, a sequence range 730 of "3-4," a current track location 740 of "2," a destination track 750 of "1," and car indicator 760 of "E1-E2" in order to indicate to a user to move coupled cars E1 and E2 that are currently on TRACK 2 to TRACK 1. After switch list generator 152 generates switch lists 180 in block 280, the switch lists 180 may be provided for display on switch lists 180 (e.g., to a switchman).

Figure 8:
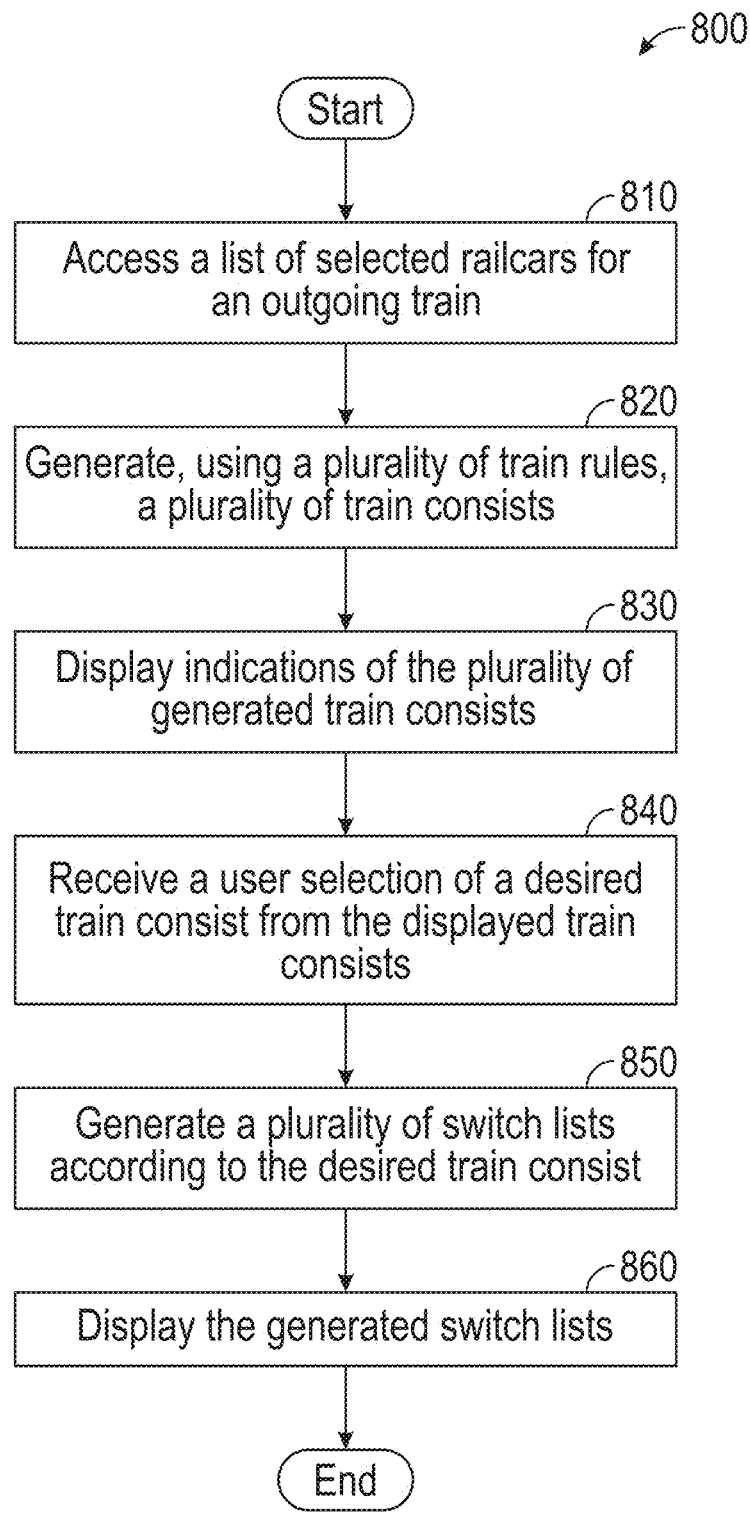
FIG. 8 is a chart illustrating a method for efficiently switching railcars at a railroad yard, according to particular embodiments.

FIG. 8 illustrates a method 800 for efficiently switching railcars at a railroad yard, according to particular embodiments. In some embodiments, method 800 may be performed by railcar switching optimizer 150 of railcar switching optimization system 100. At step 810, method 800 accesses a list of selected railcars for an outgoing train. In some embodiments, the list is list 125 of selected railcars 121 for an outgoing train. In some embodiments, the list is stored in memory such as memory 115. In some embodiments, the list is received from a client system such as client system 130.

At step 820, method 800 generates, using a plurality of train rules, a plurality of train consists that each comply with the plurality of train rules. In some embodiments, the train rules are train rules 160 and include train blocking rules, train hazmat rules, and train makeup rules. In some embodiments, the train consists are train consists 170. In some embodiments, each particular train consist includes the selected railcars for the outgoing train from step 810 and an associated number of railyard switch moves needed to build the particular train consist.

At step 830, method 800 displays indications of the plurality of generated train consists and their associated number of railyard switch moves on an electronic display. In some embodiments, the electronic display is electronic display 132 of client system 130.

At step 840, method 800 receives a user selection of a desired train consist from the plurality of displayed train consists. In some embodiments, the user selection received in step 840 is user selection 171. In some embodiments, the user selection is received from a user device.

At step 850, method 800 generates a plurality of switch lists according to the desired train consist and the current inventory of railcars in the railyard. In some embodiments, the switch lists are switch lists 180. In some embodiments, the switch lists provide step-by-step instructions about how to form the desired train consist in the railyard. In some embodiments, each switch list is associated with a particular track of the railyard. In some embodiments, each switch list indicates a sequence of cuts and moves of a plurality of railcars for the particular track. At step 860, method 800 displays the plurality of switch lists on the electronic display. After step 860, method 800 may end.

In some embodiments, some embodiments of method 800 may further determine an expected switch distance associated with each generated train consist. In some embodiments, the expected switch distance indicates a combined total distance that railcars within the railyard would traverse to form the associated train consist. In some embodiments, method 800 may display the expected switch distance for each generated train consist on the electronic display.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for efficiently switching railcars at a railroad yard including the particular steps of the method of FIG. 8, this disclosure contemplates any suitable method for switching railcars at a railroad yard including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
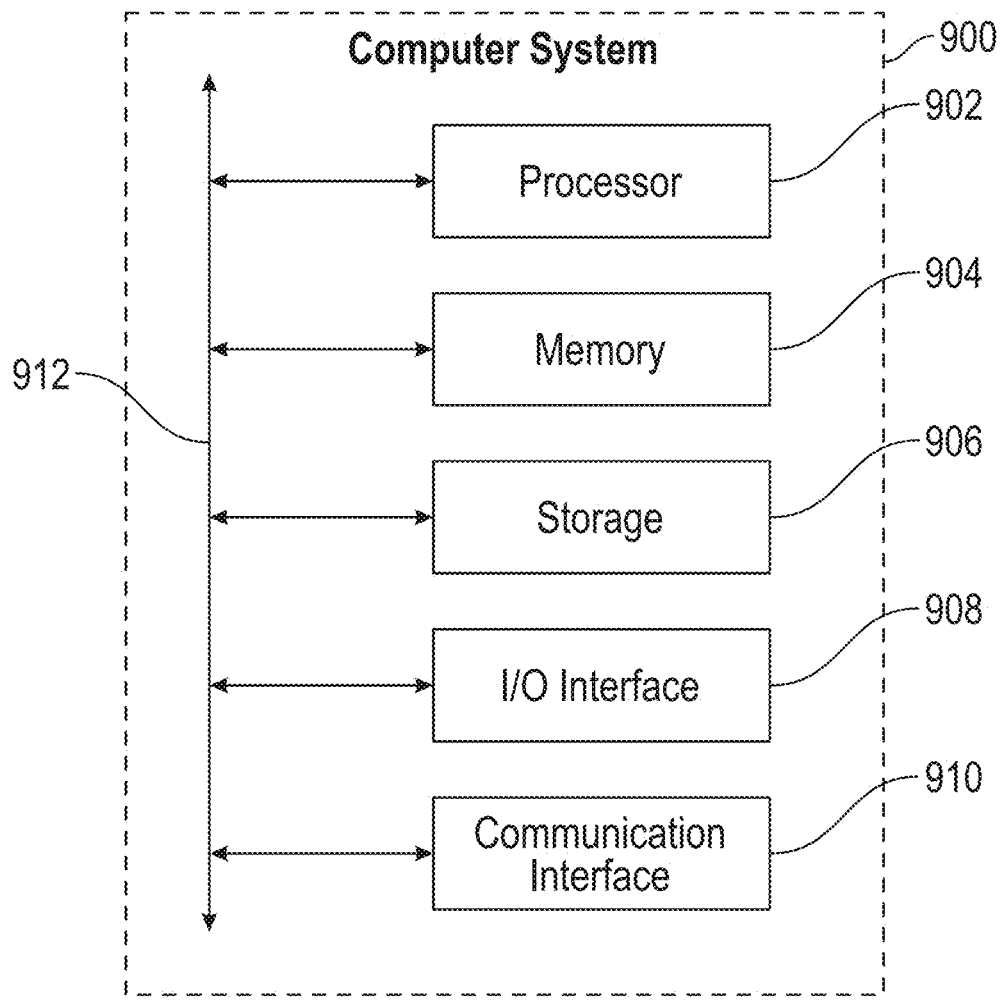
FIG. 9 is an example computer system that can be utilized to implement aspects of the various technologies presented herein, according to particular embodiments.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example, and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example, and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

The invention claimed is:

1. A system for identifying switch moves to route cuts to a desired consist, comprising:
   one or more memory units configured to store a plurality of train rules and a current inventory of railcars in a railyard; and
   one or more processors operably coupled to the one or more memory units and configured to:
   identify a train symbol to build and the railcars associated with the train symbol located in a railyard;
   construct, via a switch list generator, an option tree of states representing potential railcar moves, until an optimal desired end state is achieved wherein the optimal desired end state includes the state with the fewest number of expected switch moves or the lowest expected switch distance;
   prune options in the option tree of states that do not comply with one or more rules;
   sort, via one or more processors, a plurality of potential railcar moves to build an optimized consist;
   identify, from the option tree of states sorting results, a listing of end states that do not violate the one or more rules;
   display indications of the listing of end states that do not violate the one or more rules and the associated number of railyard switch moves on an electronic display.

2. The system of claim 1, wherein the railyard is a flat classification railyard.

3. The system of claim 1, wherein the states include possible consist builds and moves.

4. The system of claim 1, wherein one or more desired train states include train builds.

5. The system of claim 1, the one or more computer processors further configured to construct an initial state, via the switch list generator.

6. The system of claim 5, wherein the initial state can be identified as <0, 0, 1> as it is the top level (level 0), it is the parent (0), and self (1).

7. The system of claim 6, wherein the self-number for each state is incremented for each of the states from 1:m with m being the respective self number for each state.

8. The system of claim 1, wherein the option tree of states, for each subsequent level, incrementing the level number, referencing the parent self-number of the immediately preceding parent, and incrementing the self-number for each state, accordingly.

9. The system of claim 1, wherein the one or more rules include evaluation criteria for each state to reduce the processing load.

10. A method of identifying switch moves to route cuts to a desired consist, comprising:

identifying a train symbol to build and the railcars associated with the train symbol located in a railyard;

constructing, via a switch list generator, an option tree of states representing potential railcar moves, until an optimal desired end state is achieved wherein the optimal desired end state includes the state with the fewest number of expected switch moves or the lowest expected switch distance;

pruning options in the option tree of states that do not comply with one or more rules;

sorting, via one or more processors, a plurality of potential railcar moves to build an optimized consist;

identifying, from the option tree of states sorting results, a listing of end states that do not violate the one or more rules;

displaying indications of the listing of end states that do not violate the one or more rules and the associated number of railyard switch moves on an electronic display.

11. The method of claim 10, wherein the railyard is a flat classification railyard.

12. The method of claim 10, wherein states include possible consist builds and moves.

13. The method of claim 10, wherein one or more desired train states include train builds.

14. The method of claim 10, further comprising constructing an initial state, via the switch list generator.

15. The method of claim 14, wherein the initial state can be identified as <0, 0, 1> as it is the top level (level 0), it is the parent (0), and self (1).

16. The method of claim 15, wherein the self-number for each state is incremented for each of the states from 1:m with m being the respective self number for each state.

17. The method of claim 10, wherein the option tree of states, for each subsequent level, incrementing the level number, referencing the parent self-number of the immediately preceding parent, and incrementing the self-number for each state, accordingly.

18. The method of claim 10, wherein the one or more rules include evaluation criteria for each state to reduce the processing load.

* * * * *